United States Patent [19]
Wacht et al.

[11] Patent Number: 5,943,510
[45] Date of Patent: Aug. 24, 1999

[54] ONE-TIME-USE CAMERA WITH MULTI-PIECE FLASH CIRCUIT BOARD TO IMPROVE COMPACTNESS

[75] Inventors: Peter A. Wacht, Ontario; Joel S. Lawther, East Rochester, both of N.Y.

[73] Assignee: Eastman Kodak Company, Rochester, N.Y.

[21] Appl. No.: 09/089,084

[22] Filed: Jun. 2, 1998

[51] Int. Cl.$^6$ ............................. G03B 17/02; G03B 9/10
[52] U.S. Cl. ............................. 396/6; 396/493; 396/542; 396/543
[58] Field of Search ............................. 396/6, 452, 493, 396/535, 542, 543

[56] References Cited

U.S. PATENT DOCUMENTS

| | | | |
|---|---|---|---|
| 4,193,678 | 3/1980 | In Son | 396/401 |
| 4,885,598 | 12/1989 | Shibata | 396/315 |
| 4,973,998 | 11/1990 | Gates | 396/155 |
| 5,003,330 | 3/1991 | Kotani et al. | 390/176 |
| 5,752,119 | 5/1998 | Miyamoto et al. | 396/535 |
| 5,784,658 | 7/1998 | Hata et al. | 396/6 |
| 5,822,640 | 10/1998 | Dassero et al. | 396/542 |

*Primary Examiner*—Eddie C. Lee
*Attorney, Agent, or Firm*—Roger A. Fields

[57] ABSTRACT

A compact camera comprising a main body part, and a substantially flat flash circuit board, is characterized in that the flash circuit board has at least two separate flat board pieces, and the main body part has respective separate locations for each one of the separate pieces of the flash circuit board.

9 Claims, 2 Drawing Sheets

ONE-TIME-USE CAMERA WITH MULTI-PIECE FLASH CIRCUIT BOARD TO IMPROVE COMPACTNESS

FIELD OF THE INVENTION

The invention relates generally to the field of photography, and in particular to one-time-use cameras. More specifically, the invention relates to a one-time-use camera with a two-piece flash circuit board to improve compactness.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable exposure or frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer rotates the manual thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the exposure counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Problem

The pursuit of compactness in one-time-use cameras is a continuous design goal. This is made more difficult when the camera includes an electronic flash.

SUMMARY OF THE INVENTION

A compact camera comprising a main body part, and a substantially flat flash circuit board, is characterized in that:

the flash circuit board is divided into at least two separate flat board pieces; and the main body part has respective separate locations for each one of the separate pieces of the flash circuit board. Providing the flash circuit board in at least two separate board pieces and positioning the respective pieces at separate locations on the main body part allows for a more compact design.

DETAILED DESCRIPTION OF THE INVENTION

The invention is disclosed as being embodied preferably in a one-time-use camera with an electronic flash. Because the features of a one-time-use camera with an electronic flash are generally known, the description which follows is directed in particular only to those elements forming part of or cooperating directly with the disclosed embodiment. It is to be understood, however, that other elements may take various forms known to a person of ordinary skill in the art.

Figure 1:
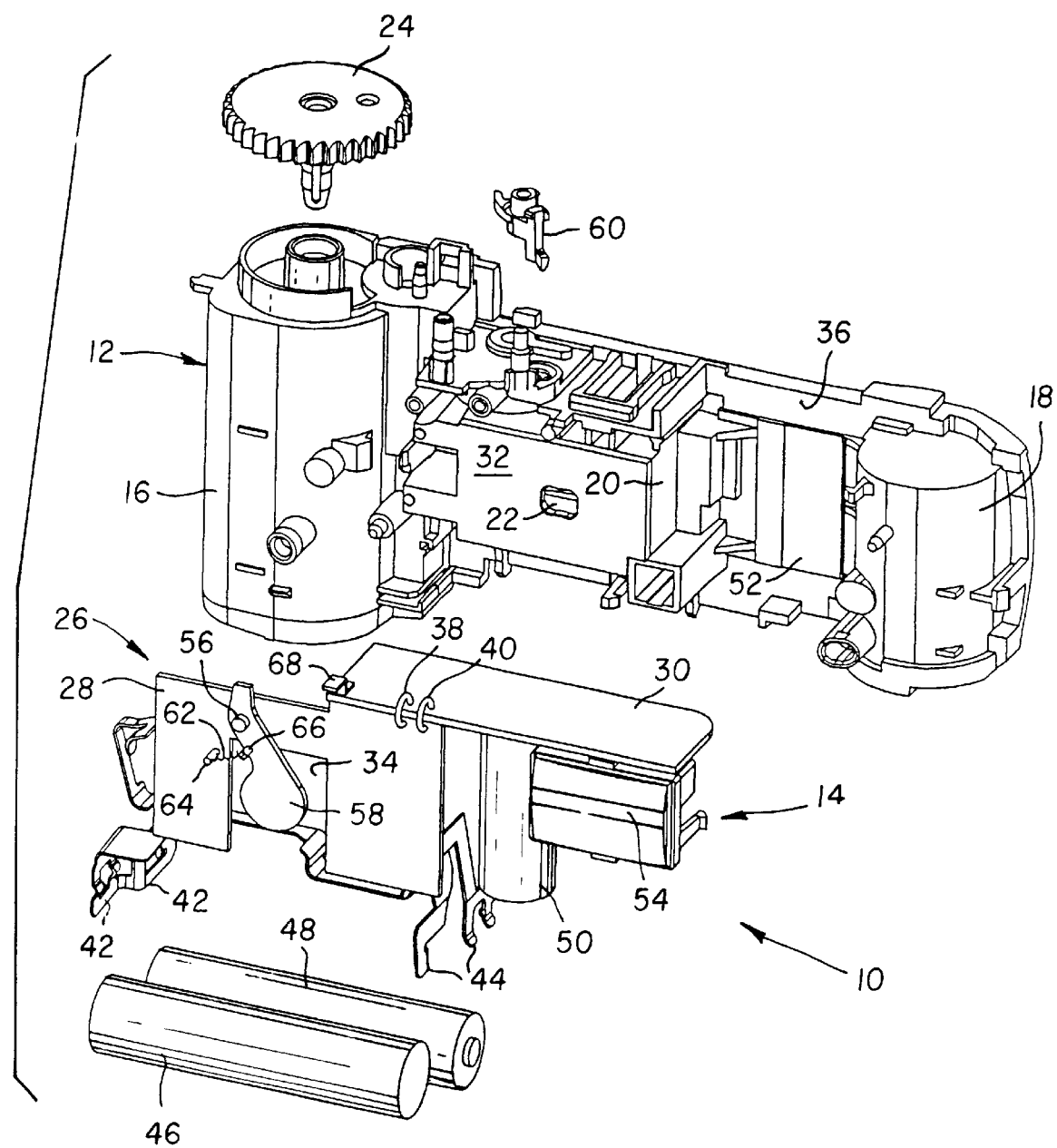
FIG. 1 is an exploded front perspective view of a partially shown one-time-use camera with a two-piece flash circuit board according to a preferred embodiment of the invention.
Figure 2:
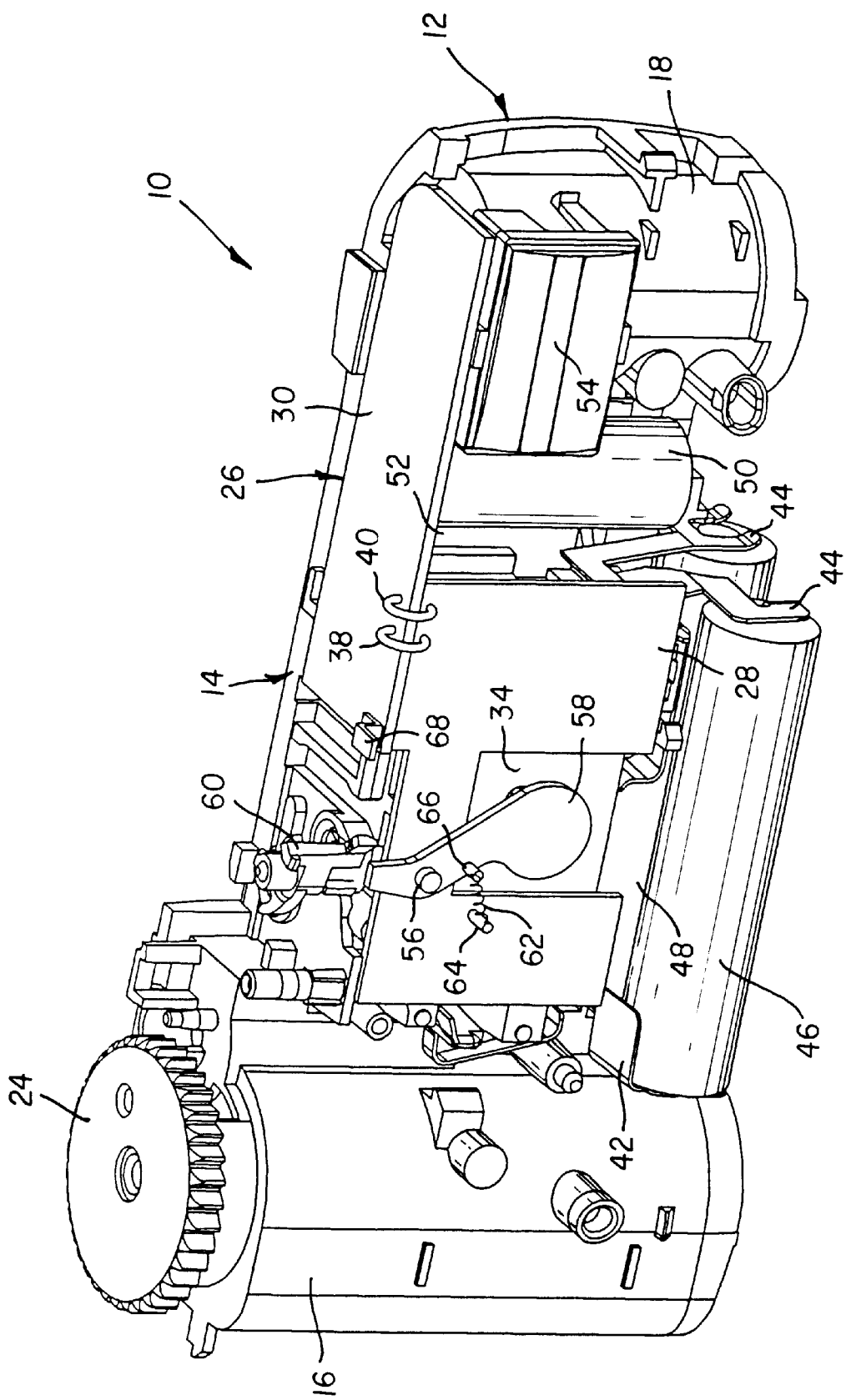
FIG. 2 is an assembled front perspective view of the one-time-use camera shown in FIG. 1.

Referring now to the drawings, FIGS. 1 and 2 partially show a one-time-use camera 10 including an opaque main body part 12 and an electronic flash 14. A pair of opaque front and rear cover parts which house the main body part 12 and the electronic flash 14 between them are not shown.

The main body part 12 has a rearwardly open cartridge receiving chamber 16 for a known film cartridge (not shown) and a rearwardly open film roll chamber 18 for an unexposed film roll (not shown). An exposure chamber 20 with a front light-admitting opening, i.e. a front exposure aperture, 22 is located between the cartridge receiving and film roll chambers 16 and 18 for exposing successive sections of a filmstrip (not shown) initially stored on the unexposed film roll in the film roll chamber 18. A film winding thumbwheel 24 is rotatably supported on the main body part 12 and has a depending coaxial stem (not shown) in coaxial engagement with a protruding end of the film spool (not shown) inside the film cartridge in the cartridge receiving chamber 14. Winding rotation of the film winding thumbwheel 24 (counter-clockwise in FIGS. 1 and 2) similarly rotates the film spool to wind each exposed section of the filmstrip into the film cartridge.

The electronic flash 14 includes a substantially flat flash circuit board 26 that is provided in two separate flat board pieces 28 and 30. One of the board pieces 28, i.e. a front board piece, is assembled to the main body part 12 at a front location 32 on the main body part. The front light-admitting opening 22 is within the front location 32, and the front board piece 28 has a central hole 34 positioned over the front light-admitting opening. Another of the board pieces 30, i.e. a top board piece, is assembled to the main body part 12 at a top location 36 on the main body part. The front and top board pieces 28 and 30 are electrically interconnected via a pair of electrically conductive wires 38 and 40.

A pair of resilient, electrically conductive, battery holders 42 and 44 are supported on the front board piece 28 to hold two batteries 46 and 48 beneath the front board piece. A known flash capacitor 50 is supported on the top board piece 30 to hang down into a nest 52 on the main body part 12 which is between the film roll chamber 18 and the exposure chamber 20. A known flash tube 54 is supported on the top board piece 30 to hang down in front of the film roll chamber 18.

A pivot pin 56 supports an electrically conductive shutter blade 58 on the front board piece 28 for pivotal shutter opening and shutter closing. A known high energy lever 60 is supported on the main body part 12 for rotation against the shutter blade 58, to swing the shutter blade open when a shutter release button (not shown) is manually depressed. A return spring 62 recloses the shutter blade 58. When closed, the shutter blade 58 extends over the hole 34 to cover the front light-admitting opening 22 in order to prevent any light from entering the opening. When opened, the shutter blade 58 is pivoted away from the hole 34 to uncover the front light-admitting opening 22 in order to permit light to enter the opening to expose successive sections of the filmstrip (not shown) at the exposure chamber 20.

Either the pivot pin 56, or the return spring 62 and respective spring end posts 64 and 66 on the shutter blade 58 and the front board piece 28, are electrically conductive. A known shutter-flash synchronization contact 68 is supported on the top board piece 30 for the shutter blade 58 to swing against the contact to initiate flash illumination as an incident of shutter opening.

Although not shown, the front and top board pieces 28 and 30 have a known flash circuit that is electrically connected to the battery holders 42 and 44, the flash capacitor 50, the flash tube 54, either the pivot 56 or the spring end post 64, and the shutter-flash synchronization contact 68.

The invention has been described with reference to a preferred embodiment. However, it will be appreciated that variations and modifications can be effected by a person of ordinary skill in the art without departing from the scope of the invention.

What is claimed is:

1. A compact camera comprising a main body part, and a substantially flat flash circuit board, is characterized in that:
   said flash circuit board has at least two separate flat board pieces;
   said main body part has respective separate locations for each one of said separate pieces of said flash circuit board;
   a shutter-flash synchronization contact is supported on one of said separate pieces of said flash circuit board for synchronizing shutter opening and flash illumination: and
   a shutter blade is supported on another of said separate pieces of said flash circuit board to be moved against said shutter-flash synchronization contact to initiate flash illumination as an incident of shutter opening.

2. A compact camera as recited in claim 1, wherein a flash tube is supported on one of said separate pieces of said flash circuit board.

3. A compact camera as recited in claim 2, wherein a pair of battery holders are supported on the separate piece of said flash circuit board on which said shutter blade is supported, and a capacitor is supported on the separate piece of said flash circuit board on which said flash tube is supported.

4. A compact camera as recited in claim 1, wherein said main body part has a front exposure aperture at one of said locations for said separate pieces of said flash circuit board, and said shutter blade is supported on the separate piece of said flash circuit board at the location with said front exposure aperture to uncover said front exposure aperture during shutter opening.

5. A compact camera as recited in claim 4, wherein the separate piece of said flash circuit board at the location with said front exposure aperture has a hole over said front exposure aperture, and said shutter blade extends over said hole to cover said front exposure aperture.

6. A compact camera as recited in claim 1, wherein one of said locations for said separate pieces of said flash circuit board is a front location on said main body part and another of said locations for said separate pieces of said flash circuit board is a top location on said main body part.

7. A compact camera as recited in claim 6, wherein said shutter blade is supported on the separate piece of said flash circuit board at said front location for shutter opening and re-closing, and a flash tube is supported on the separate piece of said flash circuit board at said top location.

8. A compact camera as recited in claim 7, wherein said shutter-flash synchronization contact is supported on the separate piece of said flash circuit board at said top location for said shutter blade to be moved against said shutter-flash synchronization contact to initiate flash illumination as an incident of shutter opening.

9. A method of assembling a substantially flat flash circuit board to a main body part of a compact camera, said method comprising the steps:
   providing the flash circuit board in two separate flat board pieces, with a shutter-flash synchronization contact supported on one of the separate pieces for synchronizing shutter opening and flash illumination and a shutter blade supported on another of the separate pieces to be moved against the shutter-flash synchronization contact to initiate flash illumination as an incident of shutter opening;
   assembling one of the separate pieces to a first location on the main body part;
   assembling another of the separate pieces to a second location on the main body part which is different than the first location on the main body part, but so that the shutter blade can be moved against the shutter-flash synchronization contact to initiate flash illumination as an incident of shutter opening; and
   conductively connecting the two separate pieces.

* * * * *